United States Patent [19]
Kempf

[11] Patent Number: 4,623,223
[45] Date of Patent: Nov. 18, 1986

[54] STEREO IMAGE DISPLAY USING A CONCAVE MIRROR AND TWO CONTIGUOUS REFLECTING MIRRORS

[76] Inventor: Paul S. Kempf, P.O. Box 690, Solana Beach, Calif. 92075-0690

[21] Appl. No.: 736,120

[22] Filed: May 20, 1985

Related U.S. Application Data

[63] Continuation-in-part of Ser. No. 453,599, Dec. 27, 1982, abandoned.

[51] Int. Cl.$^4$ ............... G02B 27/22; G02B 17/06; H04N 13/04
[52] U.S. Cl. .................... 350/138; 350/137; 350/630; 350/503; 352/63; 358/238; 358/88
[58] Field of Search ............... 350/137, 138, 131, 130, 350/133, 134, 135, 143, 616, 618, 630, 601, 503, 504; 358/91, 92, 88, 237, 238; 353/7, 10; 352/63, 57

[56] References Cited

U.S. PATENT DOCUMENTS

| | | | |
|---|---|---|---|
| 2,045,120 | 6/1936 | Carpenter | 353/7 |
| 3,447,854 | 6/1969 | Minter | 350/131 |
| 3,572,893 | 3/1971 | Bennett et al. | 350/137 |
| 3,785,715 | 1/1974 | Mecklenborg | 350/619 |
| 3,964,818 | 6/1976 | Humphrey | 350/137 |
| 4,322,743 | 3/1982 | Rickert | 358/88 |

Primary Examiner—Jon W. Henry
Attorney, Agent, or Firm—Brown, Martin, Haller & Meador

[57] ABSTRACT

Stereo views of a scene are reflected by plano mirrors onto a concave mirror. The plano mirrors are positioned to cause the reflected light from the concave mirror to converge on and cross the optical axis. The concave mirror focuses real images in planar registration in front of the concave mirror and on the optical axis. When viewed from beyond the real images an observer sees a separate stereo view in each eye which combine to provide a 3-D picture.

14 Claims, 6 Drawing Figures

STEREO IMAGE DISPLAY USING A CONCAVE MIRROR AND TWO CONTIGUOUS REFLECTING MIRRORS

This application is a continuation-in-part of application Ser. No. 453,599 of the same applicant filed Dec. 27, 1982, now abandoned and entitled "Stereo Image Display."

BACKGROUND OF THE INVENTION

The desirability of producing a stereo image to create a 3-D illusion is well documented for a wide range of products and services. These include instrument displays and entertainment. Prior systems for producing a 3-D display have usually been complex, costly, with poor quality image, or require the use of lenses, prisms or filters positioned immediately in front of or worn by the observer.

The phenomenon of stereopsis has long been understood and almost all prior inventions are based upon this principle. In stereopsis, steroscopic vision is accomplished primarily by the interpretation in the brain and the muscle sensation of the converging of the eyes through an angle (parallax) in order to match up the two images of the eyes which see an object from a slightly different angle. Each of the inventions of the past has used this natural phenomenon by providing two planar views (usually photographs) of a common object taken from slightly different camera angles and requiring the two eyes to superimpose these images. The methods for converging these two steroscopic views have included prisms, color separations, polarized filter separations, focused points of observation and real optical images. Modern technology has made available high quality, full color images using video techniques, but not practical technique has been devised to present 3-D video information to the viewer.

One prior art development, the Rickert U.S. Pat. No. 4,322,743 uses a projection optic to focus an image of an object on a "special screen" which has a light concentrating capability, but which does not focus an image. Rickert indicates that the image appears on the surface of the screen. A concave screen such as on a projection T.V., diffuses light rather than focuses light as would be required for projecting an image. A concave T.V. screen can concentrate the light, but cannot focus an image. In Rickert, an image focused on the surface of the screen will be brighest at the radius of the concave screen at the angle of reflection. It may be that Rickert produces such an enhanced intensity image from the concave screen for the left eye on the screen as compared with the intensity of the same image seen by the right eye. If the same procedure is used for the right eye, a moderate stereo effect may result, but it will lack good resolution and contrast.

It is highly desirable to have a 3-D real image projected in space so that it can be observed by a user without special glasses or other aids, with much greater resolution and contrast and without reduction in the brightness of the image. Such a device is particularly desirable where it is relatively low in cost and applicable to a wide variety of 3-D applications.

SUMMARY OF THE INVENTION

The present invention (which creates real optical images) is different from its predecessors because it uses a concave mirror (not lenses) to create the real images and in a such a manner as to create convergence of the eyes in much the same way as the natural phenomenon and without prisms, lenses, color or polarized filters in front of the face.

In an exemplary embodiment of the invention, a 3-D stereo display is produced by a concave mirror associated with stereo separation pairs positioned so as to produce left and right superimposed real images in space. By locating the observer beyond the real images, each eye sees a separate one of the stereo pairs, producing a 3-D effect very comparable to that experienced in normal vision.

The stereo views are reflected by reflecting mirrors, which may be flat or concave and are positioned between the stereo pairs and the concave mirror, onto the concave mirror. The common edges of the reflecting mirrors are positioned at or near the conjugate point of entrance pupils where the observer's eyes are located so as to act as aperture stops imaged at the entrance pupils.

The conjugate point will be less than the distance of the radius of the primary mirror and will vary with the distance of the observer position. Locating the common edges of the reflecting mirrors at the conjugate point obtains maximum lateral eye movement for the system. The stereo pairs and reflecting mirrors are positioned and orientated relative to one another and the concave mirror so that each one of the stereo pairs is focused to a real image formed at the point of crossover of the right and left reflections from the concave mirror.

By presenting the object in stereo pairs, one off-axis on one side of the mirror's optical axis, and the other off-axis on the opposite side of the the mirror's optical axis, then those stereo pairs will be presented individually, and in complete isolation, one each to each of the observer's eyes, and because the real images of the stereo pairs are superimposed in apparent alignment in the same plane in space, they appear as a single 3-D image.

BRIEF DESCRIPTION OF THE DRAWINGS

FIG. 3 is a diagrammatic side view of a preferred embodiment showing the left stereo separation only. The right stereo separation is similar.

DETAILED DESCRIPTION OF THE DRAWINGS

Figure 1:
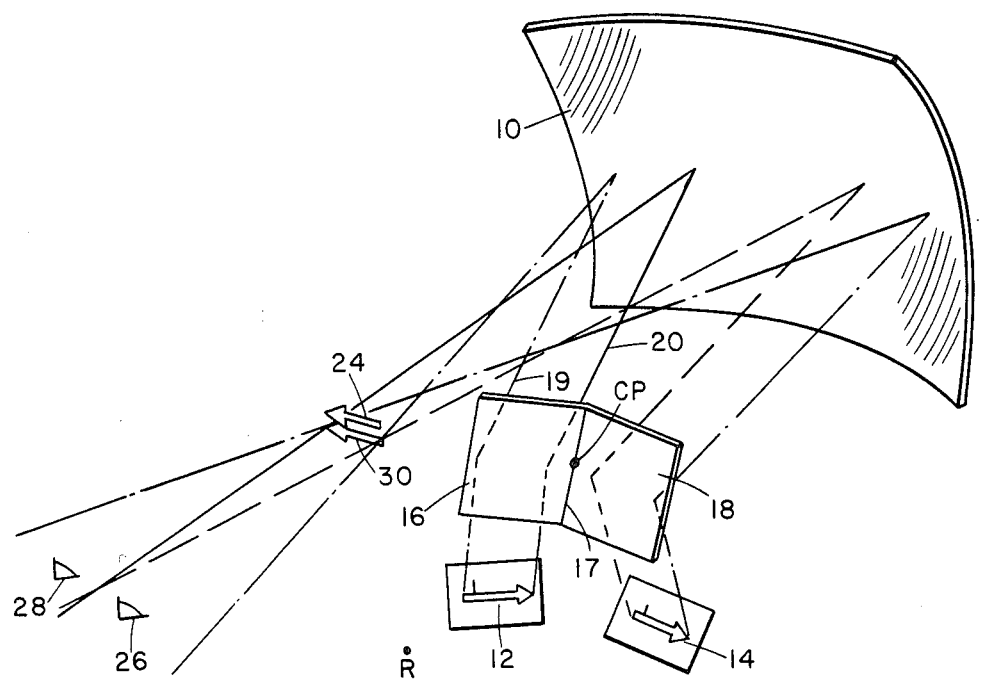
FIG. 1 is a perspective view of the principal optical components of an embodiment of the invention.

Two stereoscopic views (planar) of a common object are reflected from two contiguous mirrors (located at or near the conjugate point of the plane of the entrance pupils where the observer's eyes are located) into the concave mirror. Each of the stereoscopic views is offset laterally from the optical centerline of the concave mirror so that the resulting reflections (incidence and reflection principle) will return from the concave mirror offset from the optical centerline. The left and right reflections converge and cross one another. The concave mirror will focus (and invert) each of the images to a real image of its respective stereoscopic view. The angles of the two reflecting mirrors are selected so that both images are formed at the point of crossover. In order to put them in the same plane, the two stereoscopic views are rotated on axis so as to also rotate (and match) the two real images of the stereoscopic views into apparent registration in the same plane.

The two reflecting mirrors are also rotated in the horizontal axis so that the optical paths of the images will pass above the reflecting mirrors to the eye of the observer. Because the two images are returning from the concave mirror at different angles, each eye of the observer is located near the optical centerline of the concave mirror. Thus, each eye sees a different real image located at the same apparent position in space, but superimposed to create the impression of a single three dimensional image. The reflecting mirrors are positioned to be contiguous with minimum separation to reduce the visual impression of a bar at the extreme edge of view and thereby maximizes the lateral field of view. The stereoscopic separations provide automatically for greater image separation of close objects than far objects just as in normal vision.

The two reflecting mirrors are located at or near the conjugate point of the plane of the entrance pupils so as to act as aperture stops imaged at the entrance pupils. The maximum viewing area at the entrance pupils, allowing maximum lateral eye movement, is obtained at this point where the rays corresponding to the inner common edges of the mirrors cross the optical axis of the system, i.e. where spearate images of the mirrors are formed on opposite sides of the optical axis. Thus the plane of the entrance pupils and the common edges of the reflecting mirrors are positioned at conjugate points.

The conjugate point is determined by the mirror equation:

$$\frac{1}{p} + \frac{1}{i} = \frac{1}{f}$$

Where p is the object distance from the mirror surface, i is the image distance from the mirror surface, and f is the focal length of the mirror. Therefore, for example, if the observer were located at 39.7" from the surface of a concave mirror of focal length 13.7" then the conjugate point at which the common edges of the two reflecting mirrors would be positioned is 20.9 inches from the concave mirror surface.

With an optical quality concave spherical mirror, there is no discernible degradation of the quality of the original stereo separation images. Because there are only two front surface mirrors in the optical path, the light loss (about 10%) is undetectable. The cost of the system is low because the reflecting mirrors are readily available at low cost. The concave mirror can be produced in plastic by injection molding. Concave mirrors can also be ground and polished from sagged plastic or glass blanks very inexpensively. There is nothing complicated to require servicing or adjustment.

Figure 2:
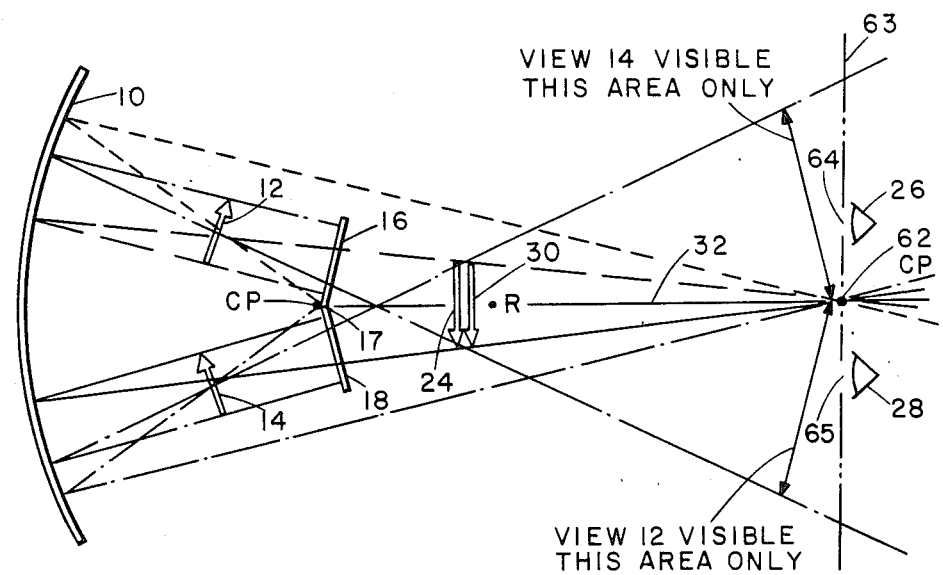
FIG. 2 is a diagrammatic top view of a preferred embodiment of the present invention.
Figure 3:
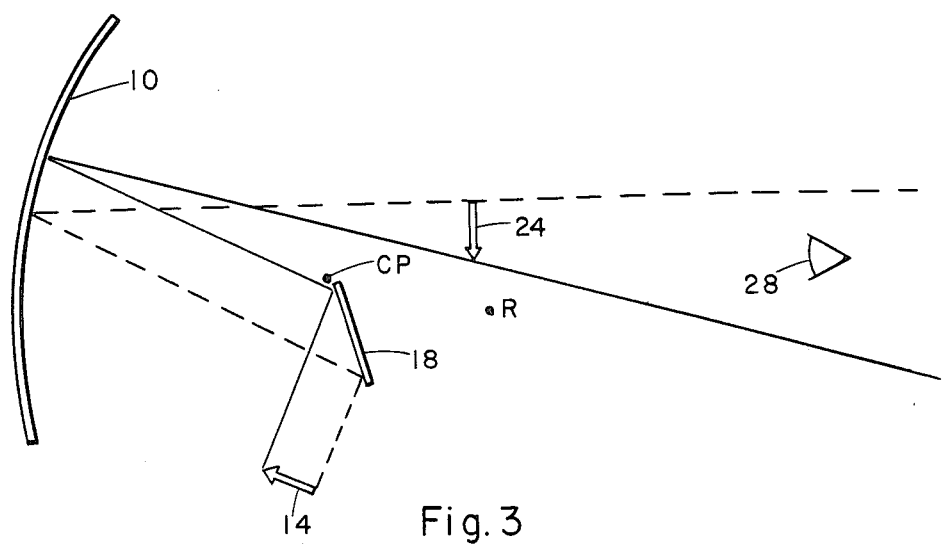

Referring now specifically to FIGS. 1 through 3, there is illustrated an embodiment of the invention incorporating a concave radiused spherical mirror 10. Light from an inverted stereo pair of two dimensional views 12 and 14 is reflected to the concave radiused mirror 10 by reflecting mirrors 16 and 18. The right stereo view on the left side of the optical axis is eventually presented to the right eye of the observer as illustrated by the ray traces. The resulting image 24 is fully erect (up is up and right is right) as illustrated by the dotted arrow on the right stereo view 12 which is presented as a real image 24 to the right eye 26. Similarly, the left stereo view 14 is presented to the left eye 28 as is represented by the arrow 30 at the real image location. The reflecting mirrors 16 and 18 are shown as plano mirrors to emphasize the fact that they do not focus on the mirror. In some installations it may be desirable to obtain some magnification by utilizing concave reflecting mirrors. However, in the practice of the invention, the mirrors would be used in the manner of a field lens to change the size, but not be utilized to focus an image. The primary concave mirror will project a real image in space at a distance at or less than the radius of curvature R for the mirror for an observer distance substantially beyond the radius of curvature.

Each of the observer's eyes 26 and 28 will see an image of an opposite stereo view as can best be seen from reference to FIG. 2. Although the real images 24 and 30 are shown in FIG. 2 as if they were side by side in a horizontal plane, this is only done for reasons of clarity and in actual fact the images from a top view would be one on top of the other at the point of crossover of the left and right reflected rays. The rays 19 and 20 representing light reflected from the reflecting mirror 16 and off of the concave mirror 10 converge to form a real image and then diverge to produce a relatively large area over which the image can be viewed by an observer's eye. The principal limitation is that the observer's eyes must be positioned so that the left eye views the left real image, and the right eye views the right real image. Maximum viewing area is obtained at the point where the rays corresponding to the inner common edges (conjugate point) 17 of the plano mirrors cross the optical axis 32, i.e. with the observer's eyes positioned at entrance pupils 64, 65 in the plane 63 of the conjugate point 62 of the common edges of mirrors 16 and 18.

Also apparent from FIG. 2 is the fact that the stereo views are canted from parallel to the optical surface of the reflecting mirrors. This canting corrects for misalignment of the image and results in parallel planar registration of the real images.

Referring to FIG. 3, the vertical arrangement of the optics is illustrated whereby an observer may be located, essentially, along the optical axis of the system and real images of the stereo views may be seen. Each of the real images appears to essentially fill the field of view of the concave radiused mirror without interference from the reflecting optics located near the conjugate point CP or 17.

The stereo views 12 and 14 may be any source of two dimensional images having three dimensional information. The three dimensional information referred to is typically obtained by having two stereo views of a scene taken from substantially the same vertical position, but spaced laterally. In this manner, the left stereo view sees more of the left side of objects, and the right stereo view more of the right side of objects. This stereo effect, of course, is more pronounced on images close to the observer position in the original photographs and, thus, when viewed through the invention, the observer detects that objects with more stereo information appear closer to the observer position than those with less stereo information.

Figure 4:
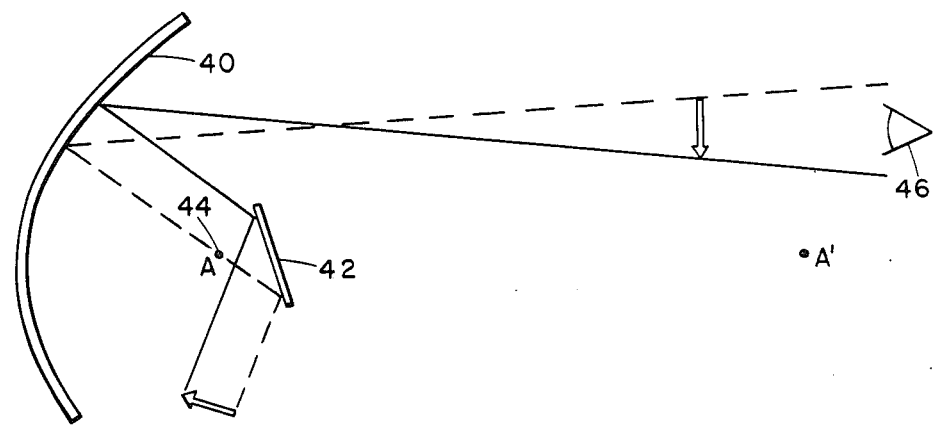
FIG. 4 is a diagrammatic side view of an embodiment showing the left stereo separation using an aspheric (elliptical) concave mirror instead of a spherical concave mirror.

Referring now to FIG. 4 there is illustrated a form of the invention utilizing a concave aspheric mirror such as the part elliptic mirror 40 illustrated. Such a configuration has the potential for even higher quality images with less distortion that those obtainable with a spherical configuration which advantages may be offset by the possible higher cost of the mirrors in low production quantities. The positioning of the reflecting mirrors 42 at the conjugate point of the plane of the entrance pupils of the observer's eye 46 is the same as for a radiused mirror. Foci 44 and 48 are the true foci points of an ellipse of which only a section 40 is used.

Figure 5:
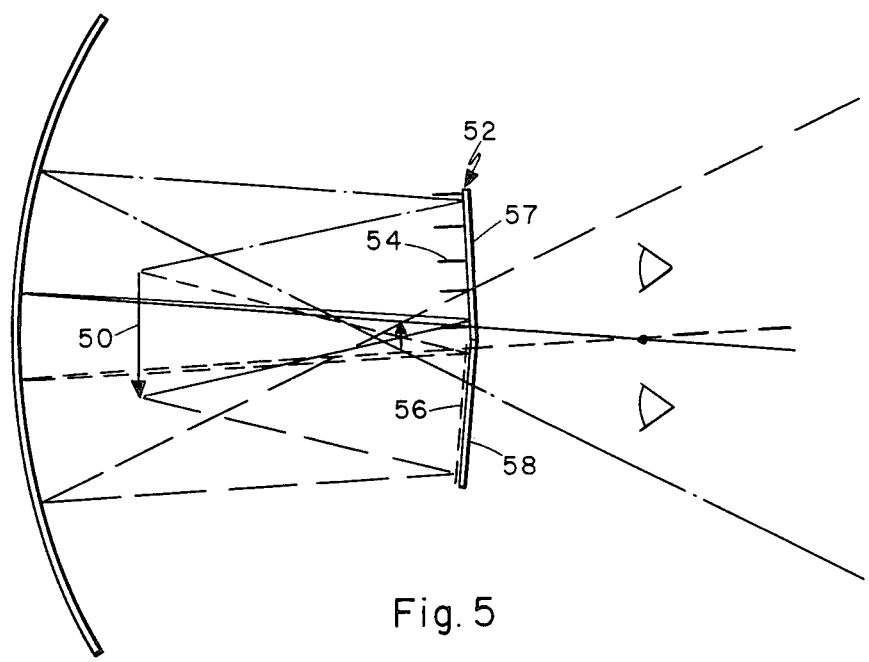
FIG. 5 is a diagrammatic top view of an embodiment showing a single video monitor on which alternating right and left stereo separations are displayed. It also shows electronic optical shutters (placed in front of reflecting mirrors) which are synchronized with the right and left stereo separation images displayed on the video monitor.

FIG. 5 represents a configuration of the invention for a three dimensional, high quality image from a single source 50 of alternating two dimensional planar images. The source 50 may be, for example, the face of a television tube. Electronic techniques may be utilized to cause left and right stereo views to alternate on the surface of the tube at a frequency undetectable to the human eye. An electro-optical shutter 52 has right 54 and left 56 halves which may be separately opened and shuttered, resulting in real images being reflected alternatively for the left and right stereo views and being presented as a real image to the observer since the mirrors 57 and 58 immediately behind the electro-optical shutter are reflecting from a single (but alternating) source of stereo images. The mirrors are canted inwardly to reflect the light from a common source and cause the left and right ray paths to cross in a manner comparable to that in FIGS. 1 through 3.

Figure 6:
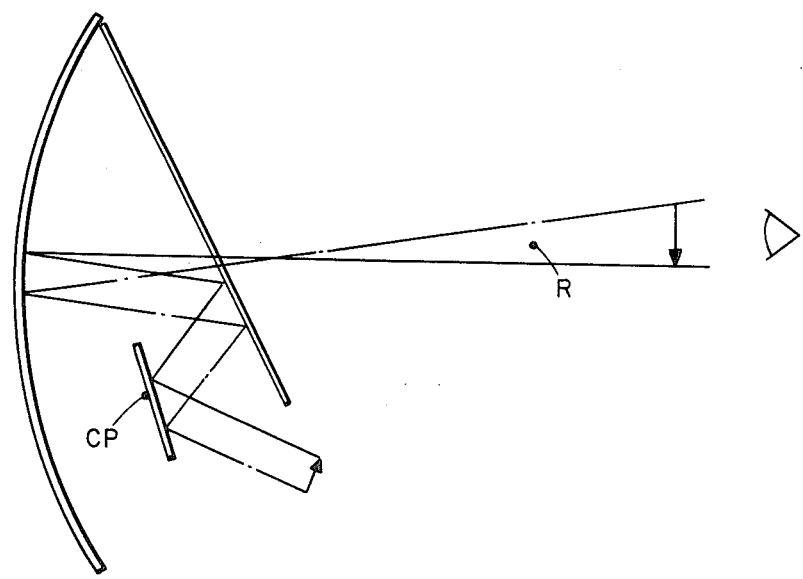
FIG. 6 is a diagrammatic side view of the left stereo separation using a beamsplitter (half mirror) in addition to the reflecting mirrors.

FIG. 6 shows the use of a beam splitter to produce an on-axis image. An on-axis image reduces distortion in those applications where image quality may be critical and the amount of light lost by unwanted reflection from the beam splitter mirror configuration is acceptable. The double reflection results in a inverted real image which can be corrected by adding one more reflecting mirror (not shown).

All of the configurations for the invention position the common edges of the reflecting mirrors at or near the conjugate point CP or 17 of the plane of the entrance pupils at the observer's eye so as to act as aperture stops imaged at the observer's eyes and to make a separation of the images into the separate eyes. In this way, the necessity of special optics at the observer position can be avoided. In this invention, no focusing prior to injecting the image onto the concave mirror is necessary to produce a 3-D image in space, nor is any focusing subsequent to or optical processing of the image required prior to the observer's eyes. All of the focusing is accomplished by the concave mirror itself. This effect of locating mirrors to reflect stereo views onto a concave mirror so that right and left real images are superimposed in apparent registration to the eyes of an observer, with the common edges of the reflecting mirrors positioned at or near the conjugate point of the plane of the entrance pupils the observer's eyes, has not been taught in prior art devices otherwise comparable to the present invention, nor has the concept of the superimposed real images created by the angle of the mirrors which causes the image to form at the crossover point.

Having described my invention, I now claim:

1. Apparatus for creating a stereo image display from right and left stereo views of a common object, comprising:
   a concave mirror;
   two contiguous reflecting mirrors whose juncture is located at or near the conjugate point of the image plane of the entrance pupils of the eyes of an observer, said reflecting mirrors being positioned and orientated for separately directing light rays from right and left stereo views, respectively, of a common object onto the concave mirror such that the light rays are focussed after reflection from the concave mirror; the concave mirror comprising means for focussing the right and left view light rays directed from the reflecting mirrors into a right and left real image in space between the concave mirror and the eyes of an observer, both real images being superimposed in apparent registration in the same plane at their point of focus to the eyes of an observer positioned beyond their point of focus for being viewed by an observer on or off axis to the concave mirror.

2. Apparatus according to claim 1, wherein:
   said mirrors have their reflecting axes rotated to produce left and right real images superimposed in planar registration.

3. Apparatus according to claim 1 wherein:
   said right and left stereo views comprise video images.

4. Apparatus according to claim 1 wherein:
   said concave mirror comprises a concave spherical mirror.

5. Apparatus according to claim 1 wherein:
   said concave mirror comprises an aspheric mirror.

6. Apparatus according to claim 1 wherein:
   said left and right real images of said object are superimposed in planar alignment.

7. Apparatus according to claim 5 wherein:
   said aspheric mirror comprises an elliptical mirror.

8. Apparatus according to claim 1 wherein:
   said reflecting mirrors comprise planar mirrors.

9. Apparatus according to claim 1 wherein:
   said left and right stereo views comprises images each having planar aspect canted from the planar aspect of the other image.

10. Apparatus according to claim 1 wherein:
    the right and left stereo views comprise alternating images from a single video monitor.

11. Apparatus according to claim 1 wherein:
    the contiguous mirrors are occulted synchronously with the right and left stereo views to the respective right and left eyes.

12. Apparatus according to claim 1 wherein:
    a beamsplitter (half-mirror) is employed to reflect the images from the reflecting mirrors into the concave mirror and to transmit the images reflected from the concave mirror through the beamsplitter on axis to the eyes of the observer.

13. Apparatus for creating a stereo image from right and left stereo views of a common object, comprising:
    a concave mirror;
    two contiguous reflecting mirrors for reflecting right and left stereo views of a common object separately onto the concave mirror such that the light rays from the two views are non-converging on arrival at the concave mirror and converge and cross over one another after reflection from the concave mirror;

the concave mirror comprising means for focussing right and left real images of the object in the same plane in space between the concave mirror and an observer positioned beyond the point of focus of the real images, the real images being formed at the point of crossover of light rays from the left and right views;

said real images being directed into corresponding eyes of an observer positioned at the conjugate point of the two reflecting mirrors and beyond the point of focus of the images, and being superimposed in apparent visual registration in the same plane to the eyes of the observer.

14. A method for producing a stereo image comprising the steps of:

positioning a first mirror to reflect a right stereo view of an object onto a concave mirror;

positioning a second mirror contiguous with the first mirror to reflect a left stereo view of the same object onto the concave mirror separately from the right stereo view, the positioning and relative orientation of the two mirrors being such that light rays from the left and right stereo view do not converge or cross over between the mirrors and the concave mirror;

forming right and left real images in space of the right and left stereo views by reflection from the concave mirror, the point of focus of the real images being located between the concave mirror and the eyes of an observer and at the crossover point of the left and right eye view light rays reflected from the first and second mirrors, respectively, and the concave mirror, and directing the respective right and left images into the corresponding eye of the observer located at the conjugate point of first and second contiguous mirrors.

* * * * *